(12) United States Patent
Haaf et al.

(10) Patent No.: US 10,927,846 B2
(45) Date of Patent: Feb. 23, 2021

(54) RADIAL FAN HAVING AN IMPELLER FOR VOLUME FLOW MEASUREMENT

(71) Applicant: ebm-papst Mulfingen GmbH & Co. KG, Mulfingen (DE)

(72) Inventors: Oliver Haaf, Kupferzell (DE); Thomas Heli, Langenburg (DE); Daniel Gebert, Öhringen (DE); Peter Riegler, Boxberg (DE); Valerius Schaaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 52 days.

(21) Appl. No.: 16/280,101

(22) Filed: Feb. 20, 2019

(65) Prior Publication Data
US 2019/0186498 A1 Jun. 20, 2019

Related U.S. Application Data

(63) Continuation of application No. PCT/EP2017/069996, filed on Aug. 8, 2017.

(30) Foreign Application Priority Data

Aug. 23, 2016 (DE) .................... 10 2016 115 615.9

(51) Int. Cl.
| | | |
|---|---|---|
| *F04D 29/42* | (2006.01) | |
| *F04D 27/00* | (2006.01) | |
| *F04D 29/52* | (2006.01) | |
| *H02K 9/06* | (2006.01) | |
| *H02K 5/04* | (2006.01) | |
| *H02K 11/215* | (2016.01) | |

(Continued)

(52) U.S. Cl.
CPC ......... *F04D 29/281* (2013.01); *F04D 27/001* (2013.01); *F04D 29/4226* (2013.01);
(Continued)

(58) Field of Classification Search
CPC ........ H02K 9/06; H02K 11/215; H02K 15/16; H02K 5/04; F04D 29/526; F04D 29/281
(Continued)

(56) References Cited

U.S. PATENT DOCUMENTS

| | | | | |
|---|---|---|---|---|
| 2002/0062830 A1* | 5/2002 | Meier | .................. | A62B 18/006 128/206.12 |
| 2015/0159882 A1* | 6/2015 | Heinz | .................. | F04D 27/001 99/337 |

(Continued)

FOREIGN PATENT DOCUMENTS

| | | | | |
|---|---|---|---|---|
| DE | 19705660 A1 * | 8/1998 | ............... | G01F 1/10 |
| EP | 1197244 A2 | 4/2002 | | |

(Continued)

OTHER PUBLICATIONS

Machine Translation DE19705660 (Year: 1998).*

(Continued)

*Primary Examiner* — Jose A Gonzalez Quinones
(74) *Attorney, Agent, or Firm* — Harness, Dickey & Pierce, P.L.C.

(57) ABSTRACT

A radial fan has a housing with a motor-drivable fan wheel. The fan wheel generates an air volume flow during operation. The housing has a blow-out portion (4) with an impeller (5). The impeller (5) has a plurality of impeller blades (7) spaced apart in the circumferential direction. The impeller (5) is driven by the air volume flow generated by the fan wheel.

16 Claims, 3 Drawing Sheets

(51) Int. Cl.
    *F04D 29/28* (2006.01)
    *G01F 1/115* (2006.01)

(52) U.S. Cl.
    CPC ............ *F04D 29/526* (2013.01); *G01F 1/115* (2013.01); *H02K 9/06* (2013.01); *F05D 2250/52* (2013.01)

(58) Field of Classification Search
    USPC .................................... 310/60 R, 62, 63, 98
    See application file for complete search history.

(56) References Cited

U.S. PATENT DOCUMENTS

2017/0080373 A1* 3/2017 Engelhard ............ B01D 46/442
2017/0102007 A1* 4/2017 Stauter ...................... F24F 1/50

FOREIGN PATENT DOCUMENTS

| | | |
|---|---|---|
| EP | 2093428 A1 | 8/2009 |
| GB | 2049925 A | 12/1980 |
| GB | 2504002 A | 1/2014 |
| JP | H04125421 A | 4/1992 |

OTHER PUBLICATIONS

International Search Report and Written Opinion (in German) dated Oct. 10, 2017.
German Search Report dated Jul. 24, 2017 in corresponding German Application No. DE 10 2016 115 615.9.

* cited by examiner

RADIAL FAN HAVING AN IMPELLER FOR VOLUME FLOW MEASUREMENT

CROSS-REFERENCE TO RELATED APPLICATIONS

This application is a continuation of International Application No. PCT/EP2017/069996, filed Aug. 8, 2017, which claims priority to German Application No. 10 2016 115 615.9, filed Aug. 23, 2016. The disclosures of the above applications are incorporating herein by reference.

FIELD

The disclosure relates to a radial fan that better determines the delivered volume flow.

BACKGROUND

In many ventilation and air conditioning applications, it is necessary to determine the delivered volume flow of a fan or ventilator and regulate it so that it is constant. Furthermore, in such applications, the demands are high for the least possible production of fan noise.

Traditionally, drum rotor fans are employed in ventilation and air conditioning applications. These are distinguished by a good noise behavior even under disturbed intake flow conditions. The determination of the volume flow, in the case of drum rotor fans, is possible thanks to a distinct relationship between power consumption and volume flow at constant rotary speed. However, they have a drawback of relatively low efficiency compared to radial fans, especially with fan wheels having backward curved blades.

Due to increased efficiency demands, drum rotor fans are being increasingly replaced by radial fans, particularly, radial fans that include backward curved blades. However, these radial fans have no distinct relationship between power consumption and volume flow at constant rotary speed. Therefore, a different method is needed to determine the delivered volume flow. One known solution is to sample the static pressure in the inlet nozzle of the fan with the aid of a ring conduit. Using this method, the volume flow can be determined directly from the measured static pressure. Typically, three or four pressure sampling fittings are connected across a ring conduit and connected to a pressure sensor. However, such a ring (hose) conduit entails a large installation expense and hence higher costs.

Furthermore, it is a disadvantage in the calculations that a quadratic relation exists between the delivered volume flow and the effective pressure. Thus, the measurement accuracy is significantly worsened in the case of low volume flows.

Therefore, the problem that the disclosure proposes to solve is to provide a radial fan whose actually delivered volume flow can be determined with the least possible deviation in the case of low volume flows, especially also in the range below 10% of the maximum volume flow.

This problem is solved by the combination of features according to a radial fan having a housing and a motor-drivable fan wheel that generates an air volume flow during operation. The housing includes a blow-out portion with an impeller arranged in the blow-out portion. The impeller includes a plurality of impeller blades spaced apart in the circumferential direction. The impeller is driven, via the impeller blades, by the air volume flow generated by the fan wheel. The impeller includes a support ring arranged axially spaced apart from the impeller blades. The support ring engages the blow-out portion of the housing and secures the impeller on the housing.

SUMMARY

According to the disclosure, a radial fan has a housing with a motor-drivable fan wheel. The fan wheel generates an air volume flow during operation. The housing has a blow-out portion where an impeller is positioned. A plurality of impeller blades are spaced apart in the circumferential direction. The impeller is can be driven by the air volume flow generated by the fan wheel. The impeller is passive in the blow-out portion and only rotates when the actively motor-driven fan wheel generates the air volume flow. The gradient or curvature of the impeller blades can be suitably adapted to different volume flows of the respective radial fan. The rotation and rotary speed of the impeller can be detected and put out as a signal for further calculations. The signal processing is done through a controller. The sensitivity of the impeller in the blow-out portion is high. Thus, for both low and high air volume flow a corresponding low or high rotary speed of the impeller can be determined. The rotary speed of the impeller basically stands in a linear relation to the air volume flow. According to the disclosure, this forms the reference quantity to determine the air volume flow.

By performing a rectifying function, the impeller also positively influences the flow in the blow-out portion and reduces the noise production. The efficiency of the radial fan is not reduced by the use of the impeller.

In one embodiment, it is proposed that the impeller entirely covers the blow-out cross section area of the blow-out portion. This has the consequence that the entire air volume flow generated by the fan wheel is delivered through the impeller. This has additional positive impact on the precision in the case of low air volume flow. The blow-out cross section area of the blow-out portion and the impeller are round in one advantageous embodiment.

In one modification, the impeller includes a ring radially surrounding the impeller blades on the outside. The ring extends in the circumferential direction along the respective radial end of each of the plurality of impeller blades. The encircling ring forms a defined outer peripheral edge for the impeller blades. The air volume flow flows along the inside of the ring through the impeller. In one embodiment, the inner diameter Di of the ring has a size ratio with respect to the blow-out diameter Da of the blow-out portion such that $0.9*Da \leq Di \leq 1.1*Da$, further preferably $0.95*Da \leq Di \leq 1.05*Da$.

In one embodiment of the radial fan, the blow-out portion has at least one interior encircling groove. The impeller extends radially into the groove. In particular, the ring runs inside the groove. In one solution, the inner surface of the ring runs flush with the inner wall of the blow-out portion bordering on the groove.

In one variant of the radial fan, an encircling gap S is provided at least between the impeller and the housing. The gap S has a size in relation to the blow-out diameter such that $0.0025*Da \leq S \leq 0.05*Da$, further preferably $0.005*Da \leq S \leq 0.025*Da$. In absolute terms, the preferred gap size lies in the range of 0.3 to 6 mm, further preferably between 0.6 and 3 mm. The noise production of the radial fan can be positively influenced by providing the gap in the corresponding size.

For the attachment of the impeller blades, the impeller has a hub mounted axially in the center, advantageously via a roller bearing and preferably a ball bearing. The hub determines a hub diameter N. In order to improve the flow properties, the hub diameter N has a predetermined size in relation to the blow-out diameter Da, such that 0.05*Da≤N≤0.3*Da, further preferably 0.1*Da≤N≤0.2*Da. Moreover, in terms of fluidics, an embodiment is advantageous where the hub of the impeller is configured to be conically tapered in at least one axial direction, especially in the blow-out direction, toward the axis of rotation.

In one embodiment, the impeller blades of the radial fan have an axial length L in relation to the blow-out diameter Da such that 0.05*Da≤L≤0.3*Da, further preferably 0.1*Da≤L≤0.2*Da.

In order to secure the impeller on the blow-out portion of the radial fan, the impeller includes a support ring axially spaced apart from the impeller blades. The support ring engages with the blow-out portion of the housing. In one exemplary embodiment, the support ring includes at least one support strut. Advantageously, it includes a plurality of support struts arranged in a star pattern pointing toward the axial center. An axle seat is formed at the axial center. The axle is received inside the axle seat for the rotating portion of the impeller having the impeller blades. Adjacent to the axle seat, in the axial direction, is the bearing for the hub. The number of support struts, in one embodiment, is not equal to the number of impeller blades. In particular, the number is less. In one modification, the at least one support strut of the support ring has an airfoil profile. The flat leading edge of the profile is pointed in the flow direction perpendicular or substantially perpendicular to the axis of rotation.

In order to fasten the support ring on the blow-out portion, it is advantageous that the support ring, in the mounted state of the impeller, form fittingly engages in the groove of the blow-out portion. The housing of the radial fan is preferably multipart and separated in radial sections, especially in the blow-out portion. Thus, the support ring of the impeller can be inserted into a first housing half and secured in position by the mounting of the second housing half. A predetermined fastening position can be achieved and maintained by radially protruding fastening pins on the support ring and corresponding holes in the housing.

In order to determine the rotary speed of the impeller, in one variant, it includes a mechanism for setting the rotational speed of the impeller blades. Such mechanism can include one or more magnets on the impeller blades or integrated in the ring surrounding the impeller blades. Movement is detected by a Hall sensor. The Hall sensor, in one variant embodiment, is arranged at the outside on the housing in the blow-out portion of the radial fan at the height of the impeller blades. The signal detection is thus spatially separated from the flow and does not influence it.

In one modification, the radial fan includes a temperature sensor and/or humidity sensor arranged on the impeller. The sensor detects the temperature and/or humidity of the air volume flow. With the temperature and humidity readings, the air mass flow can be determined, in addition to the air volume flow.

All of the features disclosed may be combined as desired as long as this is technically possible and not contradictory. Other advantageous modifications of the disclosure are characterized in the dependent claims or shall be presented more closely in the following together with the description of the preferred embodiment of the disclosure with the aid of the figures.

DRAWINGS

The drawings described herein are for illustrative purposes only of selected embodiments and not all possible implementations, and are not intended to limit the scope of the present disclosure.

DETAILED DESCRIPTION

Figure 1:
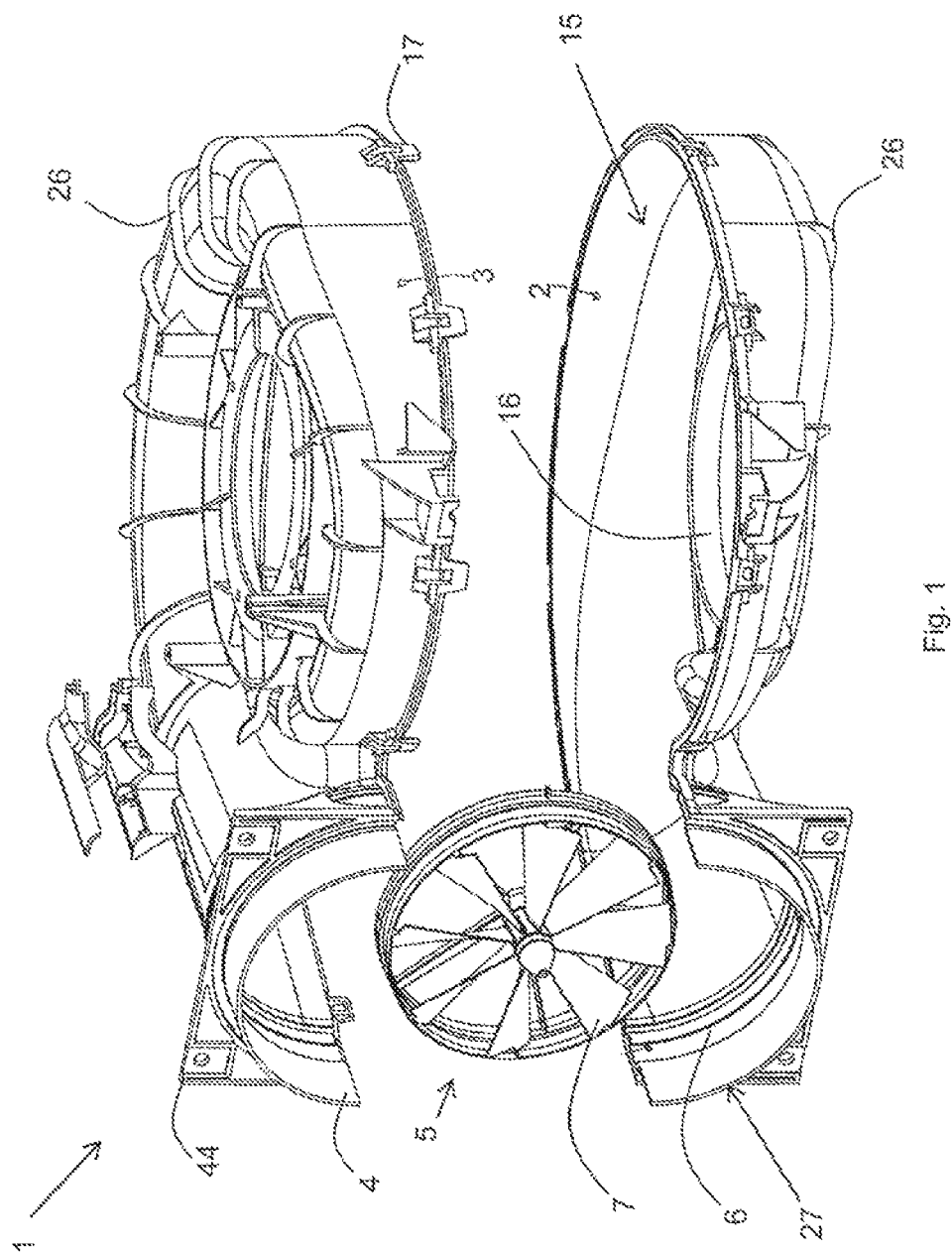
FIG. 1 is an exploded representation of a radial fan.

The same reference number denote the same parts in all the views. FIG. 1 illustrates, in an exploded representation, a radial fan 1 with a spiral-shaped housing formed from a lower housing part 2 and an upper housing part 3. A pressure chamber 15 widens toward the outlet opening 27 in the circumferential direction. The lower housing part 2 has an axial intake opening 16. The two housing parts 2, 3 have multiple stiffening ribs 26 running from the radial inside to the radial outside and spaced apart in the circumferential direction. The two housing parts 2, 3 are releasably joined together by fasteners 17, such as clamps or detent hooks. Although not explicitly represented, the fan wheel, driven by an electric motor, is arranged in the housing. The fan wheel generates, in operation, the air volume flow from the intake opening 16 to the blow-out opening 27.

The housing includes a straight-line blow-out portion 4 with a fastening flange 44 formed on its outside. The blow-out cross section area of the blow-out portion 4 is round. The blow-out portion 4 has an encircling indentation or groove 6. The impeller 5, shown in detail in FIG. 2, is inserted and secured in the groove 6.

Figure 2:
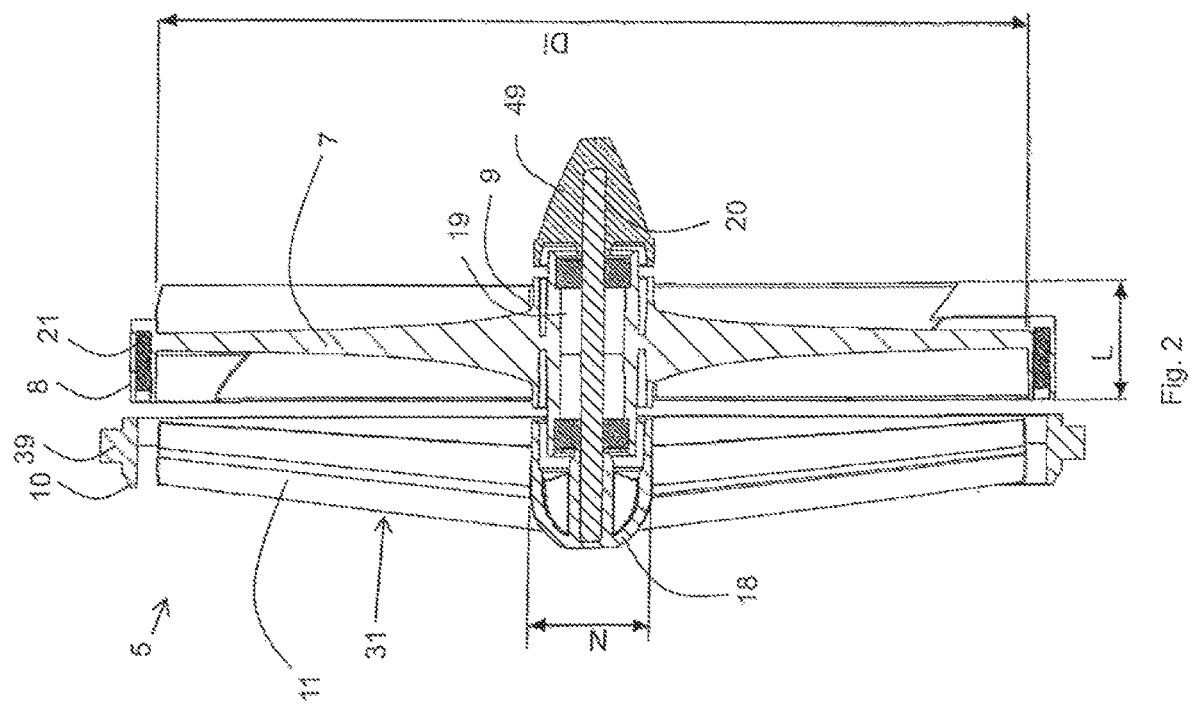
FIG. 2 is a sectional side view of the impeller of the radial fan of FIG. 1.

Referring to FIG. 2, the impeller 5, driven solely by the air volume flow generated by the fan wheel, is shown in sectional side view. The impeller 5 has eight impeller blades 7, spaced apart from each other in the circumferential direction and tilted with respect to the axis of rotation. The blades 7 extend in the radial direction toward the outside so that the blow-out cross section area of the blow-out portion 4 is entirely covered. The support ring 10, spaced axially apart from the impeller blades 7, engages in a securing manner with the groove 6 of the blow-out portion 4 of the housing. A peg 39 protrudes in the radial direction to secure the support ring 10. The pegs 39 is formed as a single piece on the support ring 10. In the mounted state on the housing, the impeller 5 is fixably held in position by the two housing parts 2, 3 via the support ring in the blow-out portion 4. The support ring 10 includes five support struts 11 extending with respect to the axis of rotation. The struts 11 are connected to the axle seat 18. The support struts 11 are configured with an airfoil profile. The lengthwise extension runs in the flow direction. The flat leading edge 31 is pointed in the flow direction substantially perpendicular to the axis of rotation. The axle 20, to receive the hub 9 of the impeller blades 7, extends from the axle seat 18 along the axis of rotation. The axle 20 is mounted by two ball bearings 19. The hub 9 is a multipart structure and has a mounted conically tapering section 49, whose free axial end points in the flow direction. The axle 20 extends into the mounted section 49. The hub diameter N of the impeller 5 is smaller, by a factor of 0.15, than the blow-out diameter Da indicated in FIG. 3.

The respective radial end of the impeller blades 7 is connected by the encircling ring 8. Magnets 21 are arranged opposite each other inside the ring 8. The rotary speed of the impeller 5 can be determined via the magnets 21 and a Hall sensor arranged on the outside of the housing. The inner diameter Di of the ring 8, in the embodiment depicted. corresponds to the blow-out diameter Da of the blow-out portion 4. Thus, there results a flush transition to the housing. The respective axial length L of the impeller blades 7, in the exemplary embodiment, is less than the blow-out diameter Da by a factor of 0.125.

Figure 3:
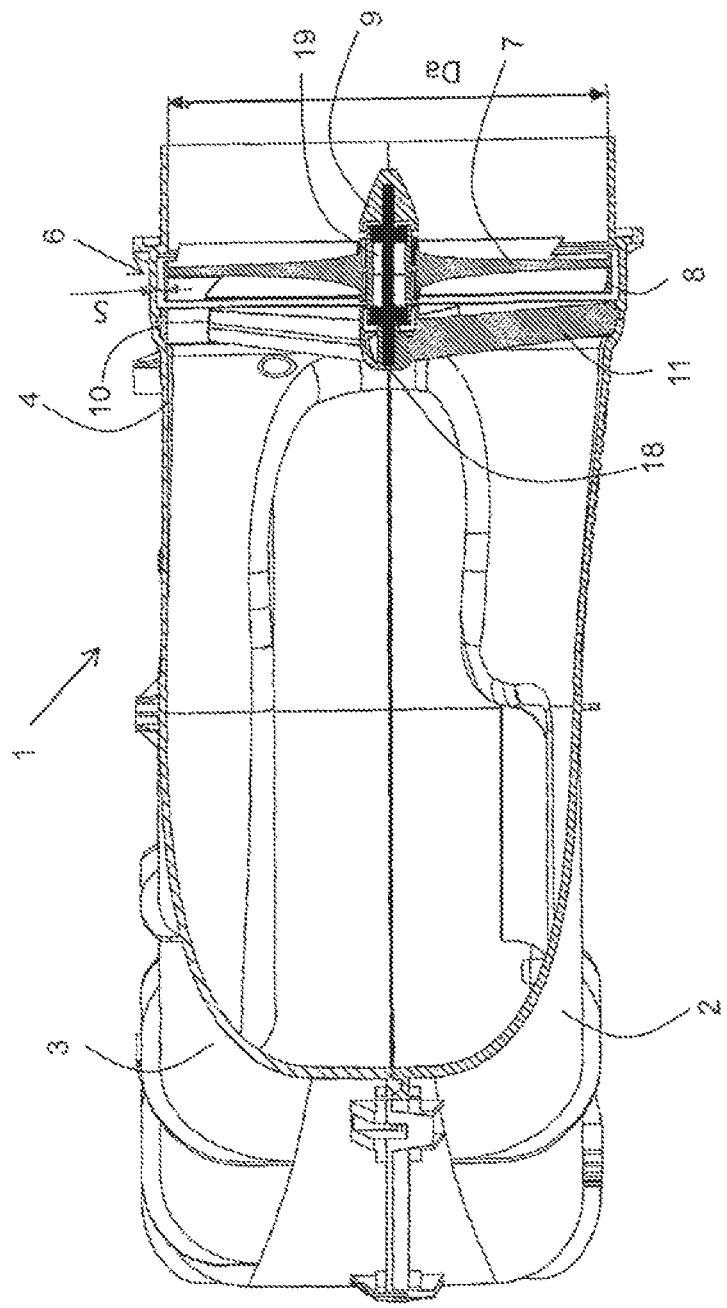
FIG. 3 is a partial sectional view of the radial fan of FIG. 1.

Referring to FIG. 3, the fastening and the interaction between impeller 5 and blow-out portion 4 is represented in further detail in a sectional view. In the blow-out portion 4, the encircling groove 6 is formed on the inside. The length on the groove 6 along the axis of rotation of the impeller 5 is large enough to entirely receive the impeller 5. An indentation is formed in the groove 6. The peg 39 of the support ring 11 engages the indentation by a form fit. Thus, this secures the impeller 5 on the blow-out portion 4 of the housing. A gap exists between the ring 8 surrounding the impeller blades 7 and the inner wall of the groove 6 in the blow-out portion 4 of the housing. The encircling gap S is smaller than the blow-out diameter Da by the factor 0.01. The impeller 5 is set back relative to the blow-out opening 27 in the blow-out portion 4. Thus, looking in the flow direction, a flow section in the housing with round cross section comes after the impeller 5 and adjacent to the flange 44.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A radial fan having a housing and a motor-drivable fan wheel that generates an air volume flow during operation, the housing comprises:
   a blow-out portion, an impeller arranged in the blow-out portion, the impeller including a plurality of impeller blades spaced apart in the circumferential direction, the impeller is driven, via the impeller blades, by the air volume flow, the impeller comprises a support ring arranged axially spaced apart from the impeller blades, the support ring engages the blow-out portion of the housing and secures the impeller on the housing.

2. The radial fan according to claim 1, wherein the impeller entirely covers a blow-out cross section area of the blow-out portion.

3. The radial fan according to claim 2, wherein the blow-out cross section area of the blow-out portion is round.

4. The radial fan according to claim 1, the impeller further comprises a ring radially surrounding the impeller blades on the outside, the ring extends in the circumferential direction along a radial end of the plurality of impeller blades.

5. The radial fan according to claim 4, wherein an inner diameter Di of the ring has a size ratio with respect to a blow-out diameter Da of the blow-out portion such that $0.9*Da \leq Di \leq 1.1*Da$.

6. The radial fan according to claim 1, wherein the blow-out portion has at least one interior encircling groove that receives the impeller.

7. The radial fan accordingly to claim 1, further comprising an encircling gap S provided at least between parts of the impeller and the housing, the gap having a size in relation to the blow-out diameter such that $0.0025*Da \leq S \leq 0.05*Da$.

8. The radial fan according to claim 1, wherein the impeller has a hub mounted axially in the center with a hub diameter N, the hub diameter N has a size in relation to the blow-out diameter Da such that $0.05*Da \leq N \leq 0.3*Da$.

9. The radial fan according to claim 8, wherein the hub of the impeller is configured to have a conical taper in at least one axial direction.

10. The radial fan according to claim 1, wherein the impeller blades have a respective axial length L in relation to the blow-out diameter Da such that $0.05*Da \leq L \leq 0.3*Da$.

11. The radial fan according to claim 1, the support ring further comprises at least one support strut and a number of support struts is not equal to the number of impeller blades.

12. The radial fan according to claim 1, wherein the support ring, in the mounted state of the impeller, form fittingly engages in the groove of the blow-out portion.

13. The radial fan according to claim 1, the impeller further comprises a mechanism for setting the rotational speed of the impeller blades.

14. The radial fan according to claim 1, further comprising at least two oppositely situated impeller blades comprise a respective magnet.

15. The radial fan according to claim 1, further comprising a temperature sensor and/or humidity sensor arranged on the impeller, to detect the temperature and/or humidity of the air volume flow.

16. The radial fan according to claim 6, wherein the support ring, in the mounted state of the impeller, form fittingly engages in the groove of the blow-out portion.

* * * * *